United States Patent Office 2,815,038
Patented Dec. 3, 1957

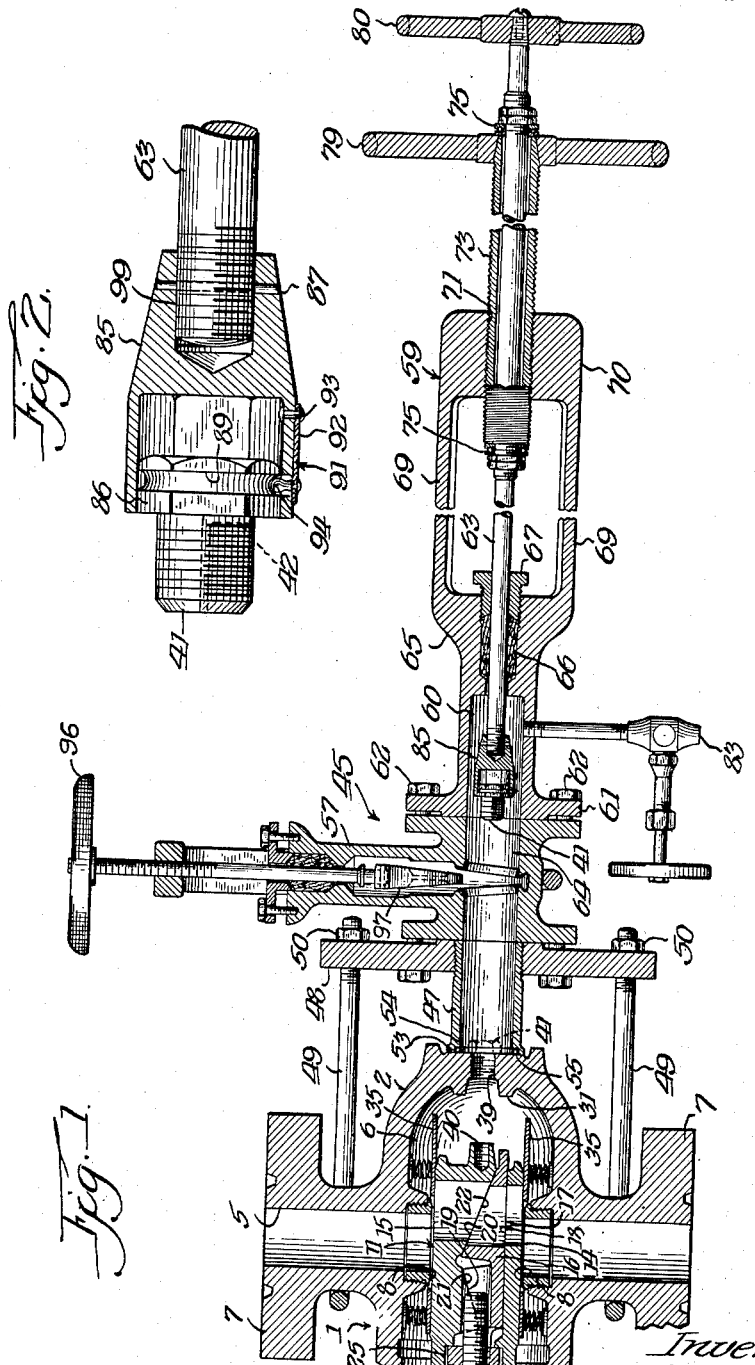

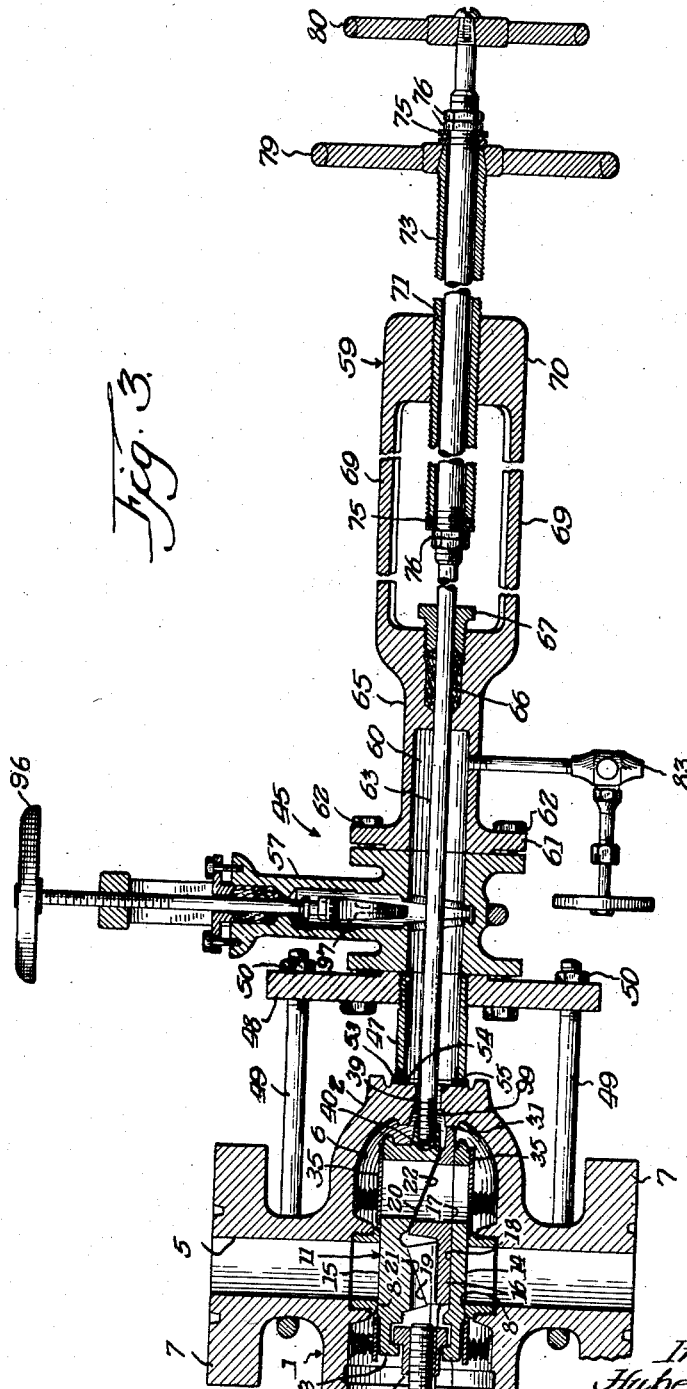

2,815,038
VALVE REPAIR AND SHUTOFF STRUCTURE

Hubert C. Laird, Oak Park, and Kurt E. B. Bredtschneider, Chicago, Ill., assignors to Crane Co., Chicago, Ill., a corporation of Illinois Application December 2, 1954, Serial No. 472,676

6 Claims. (Cl. 137—328)

This invention relates to valves and more particularly, pertains to a construction providing for the repair of valves under fluid pressure.

In copending application, Ser. No. 472,499, filed December 1, 1954, the novel structural arrangement for replacing broken valve stems and certain other valve parts when stem failure occurred with the closure in or near the lowermost position was presented. In that instance, a threaded plug was either removed from the lower part of the valve casing and a securing element introduced for locking the closure in the down position or a slightly different locking element which was permanently retained in the bottom of the casing was threadedly applied upwardly into engagement with the closure and tightened so as to secure it preferably in the lowermost locked position, both arrangements permitting removal of the bonnet and replacement of the valve stem and other parts while the valve was under full line pressure.

Should the valve stem fail or become damaged requiring replacement with the closure in the upper or an intermediate position, however, the provisions of the previous application can not be employed inasmuch as the valve chamber would be under full line pressure at least while the closure is being moved into the lowermost fluid sealed position, which would permit loss of that line pressure to atmosphere and the outflowing of fluid through the opening in the bottom of the valve during such movement.

According to the preferred form of the present invention, a special housing is strapped to the bottom of the valve casing in fluid tight relation therewith, said housing being provided with means adapted to withdraw the plug from the bottom of the casing under full line pressure and permit the removal thereof and then subsequently engage the closure member and move the same into the lowermost, locked position for removal of the bonnet and replacement of the valve stem and other parts as before.

It is therefore, the primary purpose of this invention to provide for valve stem replacement under pressure when stem failure occurs with the closure in the upper or partly raised position.

Other objects and advantages will be more readily apparent upon proceeding with the specification read in the light of the accompanying drawing in which:

Figure 1 is a longitudinal section of a valve to which a preferred form of the device of the present invention has been applied, showing the plug in the bottom of the valve casing in withdrawn position.

Figure 2 is an enlarged detail of the detent element of the socket for engaging the head of the plug.

Figure 3 is a view similar to Figure 1 showing the valve closure in the lowermost expanded locked position.

Referring more particularly to the drawing, the conduit type gate valve therein depicted comprises a casing generally designated 1 which is formed by a body 2 and a bonnet (not shown), the latter being secured on the body by means of the bonnet ring (also not shown). A flow passage 5 extends through the body portion, being intersected by a valve chamber 6, the upper part of which extends within the lower part of the bonnet. The body is flanged at each end at 7 for connection to a pipe line (not shown) by suitable means such as bolting (not shown).

Within the valve chamber, a valve disc or closure member generally designated 11 is mounted for reciprocal movement into the open and closed positions. As shown in the drawing, this closure member is made up of three parts, the outer valve parts 12 and 13 presenting plane, parallel surfaces at 14 and 15 for sealed engagement with the parallel seat rings 8 within the body when the closure is in the upper or lower limits of movement. These seat rings may, of course, be integral with the body or, on the other hand floating or plunger type seat rings may be employed, the upstream ring being actuated against the valve disc which may be a flat plate of constant thickness by line pressure, the seat rings being sealed within the body by means of O-rings. As is apparent from the drawings, the intermediate or floating wedge part 16 of the valve disc has a vertical surface 17 in engagement with the inner vertical surface 18 of the valve part 12, while presenting upper and lower flat wedge surfaces at 19 and 20 for engagement with complementary wedge surfaces 21 and 22 of the valve part 13. The inner wedge member floats or is carried along with the outer disc parts during the reciprocal movement of the closure member, the latter outer disc parts being connected to a T-head or nut member 24, receiving the latter member in the recesses 25 of those parts.

The nut member is threaded internally for receiving the threaded valve stem 28 which is mounted through the top of the bonnet for rotation therewithin by means of a handwheel (not shown). The valve stem is of the non-rising type, the mounting details through the upper part of the bonnet not being shown. It should also be noted that the intermediate wedge member 16 as well as the valve disc member 13 are hollowed out in the center for reception therewithin of the end of the non-rising stem as the latter effects upward movement of the closure member from the closed position shown in Figure 3 to the uppermost open valve position shown in Figure 1. The upper wedge surfaces 19 and 21 are therefore each divided into coplanar portions on each side of the stem recess.

The closure member is arranged for expansion sidewardly by means of the interengaging wedge surfaces above referred to when in the extreme uppermost or lowermost positions. This expansion provides tight sealing with the valve seats and is effected in the downward direction by the intermediate wedge member 16 contacting the stop 31 in the lower end of the body and the members 12 and 13 being moved downwardly past the wedge member 16 by the action of the nut and stem thereby providing wedging action between upper wedge surfaces 19 and 21. In the upward direction the spaced portions 33 on each side of the wedge member (only one being shown in the drawing figures) contact the upper inside surface of the bonnet at 34, halting progress while the outer members are continued in their movement forming a wedging action between the inclined surfaces 20 and 22 for expansion in the opened position. To complete the assembly, resiliently mounted wiping plates 35 are mounted, one on each side of the closure member, being relieved for protrusion therethrough of the valve seats, said wiping plates being resiliently held in contact with the outer flat surfaces 14 and 15 of the closure member for wiping excess lubricant from these faces and preventing leakage within the flow passage 5 in the body.

In the lower part or bottom of the body a threaded opening 39 is provided which is oppositely disposed relative to and in line with the closure member actuating mechanisms or the valve stem 28 thereof. In normal operation in the form of valve shown, a threaded plug 41 is secured within the opening 39, the plug being provided with a bleed passage 42 for relieving pressure within the valve chamber when screwed out slightly. As explained in the copending application above referred to, it is a common occurrence for workmen or valve operators to apply wrenches or lever bars to the handwheels for further tightening in either the open or closed positions which often results in over stressing of the valve stem and injury or failure of the same. Inasmuch as the non-self-rising stem does not indicate in what position the disc is, that is whether open or closed, injury or failure may also result from an effort to place the valve in the sealed open position when in fact it has already been opened or perhaps when it is desired to break loose the wedge surfaces and move the valve out of the open position and actually it is being turned in the wrong direction and being further tightened.

Where the valve stem has been broken with the closure in the uppermost position, as mentioned in the preamble the arrangements of the copending application referred to cannot be employed for moving and securing the closure member in the down position for subsequent repair of the valve, inasmuch as the valve chamber will be subjected to full line pressure while the closure is being moved from the upper position towards the lower position, which will cause loss of the line pressure and fluid through the opening in the bottom of the valve during such movement of closure member.

According to a preferred form of the present invention, a housing or hollow construction generally designated 45 is mounted on the bottom of the valve casing 1 in substantially fluid sealed relation for removal of the plug 41 in the bottom of the casing and subsequent engagement and lowering of the closure member into the lowermost secured position, all under pressure.

This housing preferably is made up of a tubular member 47 provided with a flange 48 through which extend U-bolts 49 passing around the reduced portions of the valve body 2 at each side adjacent the flanges 7. The U-bolts are of course provided at the ends with nuts 50 for drawing the tubular member 47 into tight engagement with the bottom of the casing. In this connection, it should be noted that the valve body is provided with a flat, preferably machined surface 53 and that the tubular member is annularly recessed on the end at 54 for reception of a resilient annular seal member 55 for insuring fluid tight connection between the end of the housing 45 and valve body 2. As shown in the drawing, a gate valve 57 of suitable size is bolted to the flange 48 of the tubular member; also in fluid sealed relation therewith. Beyond the valve member in turn is mounted an actuator member generally designated 59 which is hollow at the end adjacent to the valve at 60 and which is connected to the valve through the flanged lower portion 61 by means of bolts 62, also in fluid tight connection therewith. The hollow portion 60 is a continuation of the hollow interior of the tubular member 47 and valve 57 to form the elongated chamber 64 of the housing 45. The actuator member 59 is provided with a reciprocally and rotatably movable stem 63 which is in axial alignment in the mounted position shown with the threaded opening 39 and threaded recess or socket 40 in the closure member 11 of the valve. The stem passes through the solid portion 65 of the actuating member which is provided with packing 66 around the stem, secured by means of the gland 67. The actuating member is provided with plurality of yoke arms 69 surmounted by a hub portion 70 which is threadedly recessed at 71, also in alignment in the mounted position shown with the recesses 39 and 40 of the valve to be repaired for engagement with the externally threaded sleeve 73. The latter sleeve is hollow for passage of the stem 63 therethrough, the said sleeve being secured on the stem by means of thrust bearings 75 at each end thereof, held in end-wise contact with the sleeve member by means of nuts 76 at opposite ends of the member. To complete the assembly, handwheels 79 and 80 are secured on the ends of the sleeve and stem members, respectively. A bleeder valve 83 is also provided, which is connected to the hollow interior of the actuator member beyond the gate valve 57. To the inner end of the stem 63 is removably attached thereto a recessed socket 85 which is adapted to receive the polygonal head portion 86 of the plug 41 in the lower part of the valve 1. This socket is prevented from turning or unthreading from the threaded end of the stem by means of the securing pin 87. It should also be noted that the plug member is annular grooved at 89 around the head for engagement therewithin of a spring catch 91 on the socket member, the catch consisting of a resilient arm 92 riveted or otherwise secured to the socket at 93 and including a rounded projection 94 adapted to snap within the groove of the plug when the socket is slipped over the head of the plug. The plug is thus retained within the socket after removal of the plug from the bottom of the casing and in the course of withdrawing it to the position shown.

It should be evident that the rotation of the handwheel 79 causes axial movement of the stem 63 in either direction, depending on the direction of that rotation, whereas rotation of the outer handwheel merely effects rotation of the stem.

In operation therefore, after the housing unit 45 has been mounted on the bottom of the valve, as previously covered, the inner handwheel 79 of the unit is turned so as to produce inward movement of the stem 63 until the socket element 85 at the inner end of the stem engages the polygonal head of the plug 41 in the casing and the catch 91 springs into position within the annular groove of the plug. The outer handwheel 80 is then turned so as to loosen and unscrew the plug member from the bottom of the valve body, the inner handwheel being turned slowly in the reverse direction at the same time the other one is turned so as to permit backing off the plug. After removal of the plug from the casing, rotation of the outer wheel is stopped and the inner handwheel is then turned alone on the reverse direction until the end of the stem socket member and attached plug all have been withdrawn from adjacent the valve casing and into the portion of the chamber 64 outwardly of or beyond the gate valve 57, as shown in Figure 1. The latter valve is then closed in the usual manner by rotation of its handwheel 96, moving the valve disc 97 across the hollow interior or elongated chamber 64 of the attached housing 45 so as to seal off the interior of the valve casing 1 and portion of the chamber 64 inwardly of the closure member or gate 97. The bleeder valve 83 is then opened to bleed off the entrapped pressure outwardly of the valve 57 and closed again. The bolts 62 are next loosened and the actuating member 59 withdrawn from the rest of the housing unit for removal of the socket 85 and attached plug 41 therefrom after first disengaging the retaining pin 87.

The actuating member minus the socket and plug is then reconnected to the outer flange of the valve 57 and the nuts 62 tightened, after which the valve disc 97 is opened and the stem 63 moved inwardly by rotation of the handwheel 79 in the original direction until the threaded end portion 99 of the stem contacts the threaded recess or socket 40 of the valve closure 11 or more particularly, the outer part 13 thereof. At this time the outer handwheel 80 is turned so as to rotate the stem within the threaded recess 40 for interengaged relation therewith, the inner handwheel also being turned slightly to permit this engagement. The said inner handwheel 79 is then operated in the reverse or opposite direction to effect a downward pull on the closure member, first causing unwedging of the same in its expanded upper position and then drawing the closure downwardly into the lower expanded position shown in Figure 2. The closure member then being secured or locked in this condition, the valve may be opened at the top by removal of the bonnet 2 for subsequent replacement of the valve stem 28 and other necessary parts.

Although the above described construction and operation of the housing unit is preferred in the best interest of safety, if the valve seats 8 and closure 11 of the valve 1 are in reasonably good condition so as to insure substantial fluid tight engagement of the latter closure within the valve in the open position, it may be desired to eliminate the use of the gate valve 57 in the housing unit. In this case the actuating member 59 would then be connected directly to the flange 48 of the inner tubular member 47 in fluid tight engagement therewith. Where for instance the stem of the valve to be repaired has failed when the closure member is in the expanded upper position, the plug member 41 in the bottom of the valve body may prior to any attachment of the housing unit be rotated slightly outwardly until the outer end of the bleed passage 42 is exposed to atmosphere for relief of internal pressure in the valve chamber 6. Care should be taken not to unscrew the entire plug member at this time, inasmuch, as there may be leakage between the flow passage 5 of the casing and the valve chamber 6 thereof which may be in excess of the amount that can be relieved through the passage in the plug, thus retaining sufficient pressure behind the plug on many cases to eject the same with considerable force and violence if turned out too far with danger of injury to the person so removing it or damage to equipment nearby. If by careful checking it is determined that the closure is in the expanded fluid tight condition and that internal pressure in the valve chamber has been completely relieved, the plug may then be entirely withdrawn and the modified housing without the gate valve 57 attached to the bottom of the valve to be repaired in the same manner previously covered. In this case, since the plug member has already been removed prior to attachment of the housing, the inner handwheel 79 may be turned until the stem 63 contacts the threaded recess 40 of the closure member, the outer wheel 80 then being turned with the other for effecting threaded engagement of the stem threads 99 therewithin. The inner handwheel 79 is then reversed in rotation for unwedging and pulling of the valve closure 11 away from the upper position into the locked or secured lower expanded condition shown in Figure 2. This therefore is an alternate construction and method of operation to that previously described. The bleeder valve 83 may, of course, be employed in this latter construction and opened after the valve stem 28 or other parts have been replaced and prior to detachment of the housing unit from the valve for relieving pressure of the chamber portion 64 which was built up when the closure member 11 was moved from the uppermost to the lowermost position in the collapsed condition.

Where the stem fails with the closure in an intermediate partly open position as a result of preseating for instance, the alternate construction and method of operation of course can not be employed.

Although the terms "housing" or "housing unit" have been applied to the means attached or connected to the bottom of the valve casing, the latter means need not necessarily be in the form of a housing, that is possessing a hollow chamber, but rather, where the plug 41 can be removed prior to connection of the means, the means may simply overlie the outside of the plug opening in fluid sealed engagement with the valve casing for introduction of the stem 63 within the valve chamber and into engagement with the closure member subsequent pulling of the latter into the lowermost expanded position as before.

It should also be noted that although thrust bearings 75 are shown in the drawing between the sleeve 73 and nuts 76, these may be omitted in which case the nuts of similar elements would take the direct thrust, after being turned into relatively close relation with the ends of the sleeve on the threading of the stem. Further, at least the nuts of one end or a shouldered portion similar thereto may be formed as an integral one of the part of the stem 63 if desired, still being one of the elements or parts of the "means cooperative between a portion of the connected means and stem thereof for exerting the end-wise force on the said stem" or similarly expressed means included in the various claims.

Where the floating or plunger type seat rings previously referred to are employed with the plate type closure of constant thickness, also mentioned, the closure need not necessarily be in an extreme end limit of movement for fluid tight sealing to be effected as long as the port in the disc is out of register with and well removed from the flow passage in the body where securement in the closed position is desired and as long as it is in full registry where securement in the open position is desired.

Although the present disclosure has been concerned primarily with locking the closure member in a down position, for some valve constructions as where the port through the disc is in the upper rather than the lower part, it may be desired to secure the closure in the up or a raised position, so long as the valve disc is in fluid sealed relation with the seat surfaces of the valve. Also, the present invention is primarily concerned with moving the closure member when valve stem failure has occurred; however, it is contemplated that the present special structure may be employed to prevent such failure in the first instance by providing supplemental means for exerting additional force on the closure for freeing the same for movement, for instance, the present invention is subject to further modifications and other embodiments beyond those disclosed herein and should therefore be limited only by the language of the appended claims, falling within the broad spirit of the invention.

We claim:

1. In combination with a valve having a casing including valve seat means and a reciprocally movable closure member within the casing, said valve being provided with means extending into the casing from one direction for normally actuating the closure member, said casing having an opening and a removable plug therefor opposite the actuating means, said closure member having an engageable portion inwardly of the plug, hollow means connected to the valve casing in substantially fluid tight engagement over the plug and opening thereof, the hollow portion of the latter means forming an elongated chamber, said hollow means including elongated rod means reciprocally movable within the chamber, said latter elongated rod means being provided with removable means adapted to engage the said plug and remove the same from the valve casing upon predetermined rotation of the elongated rod means, said hollow means being provided with valve means for closing off at least an axial portion of the elongated chamber thereof after predetermined axial withdrawal respectively of the elongated rod means, the said removable means and the said plug into a portion of the chamber adjacent the valve casing and after removal of the plug from the valve casing, said hollow means being openable beyond said valve means for removal of the said rod means and plug when the said last mentioned valve means is in the closed position, an end portion of said elongated rod means being passable through the plug opening in the said casing after removal of the removable means and plug and return of the hollow means to its original fluid condition and opening of the said valve means, said elongated rod means having said end portion adapted to engage the engageable portion of the closure member whereby to move the closure member into substantially fluid sealed engagement with the said seat means of the casing upon the application of predetermined endwise force on the elongated rod means.

2. The subject matter of claim 1, including removably mounted actuating means cooperative between said hollow means and elongated rod means thereof for exerting the endwise force on the said elongated means.

3. The subject matter of claim 1, the hollow means connected to the said casing including actuating means comprising an internally threaded portion and an outwardly threaded sleeve in engagement therewith for axial movement of the threaded sleeve in either direction upon rotation of the same in opposite directions, said sleeve being hollow for the passage of a portion of the elongated rod means therethrough, said hollow means also including means cooperative between the threaded sleeve and elongated rod means for translating the axial movement of the sleeve in either direction to the said elongated rod means.

4. In combination with a valve having a casing including valve seat means and a reciprocally movable closure member within the casing, said valve being provided with means extending into the casing from one direction for normally actuating the closure member into the open and closed positions, said casing having an opening and a threaded plug therefor opposite the normal actuating means, said closure member being provided with a threaded portion inwardly of the threaded plug and in substantial axial alignment therewith, hollow means connected to the valve casing in substantially fluid tight engagement over the threaded plug thereof, the hollow portion of the latter means forming an elongated chamber in substantial alignment with the threaded plug and said threaded portion in the closure member, said hollow means including a stem reciprocally and rotatably movable within the chamber, said latter stem being provided with removable end means adapted to engage the said plug and remove the same from the valve casing upon rotation of the stem in one direction, said hollow means being provided with valve means for closing off at least an axial portion of the elongated chamber thereof after axial withdrawal respectively of the stem, removable end means and plug into said closed off portion from adjacent the valve casing after removal of the plug from the casing, said hollow means being openable beyond said valve means for removal of the said removable means and plug when the last mentioned valve means is in the closed position, said stem being passable through the plug opening in the casing after removal of the removable means and plug and return of the hollow means to its original fluid tight condition and opening of the last mentioned valve means, said stem being adapted to threadedly engage the threaded portion of the reciprocally movable closure member upon predetermined rotation of the stem relative thereto, actuating means cooperative between a threaded portion of the said hollow means and stem thereof for exerting endwise force on the stem and moving the attached closure member into substantially fluid sealed engagement with the said seat means of the casing upon rotation of at least a portion of the said cooperative actuating means.

5. The subject matter of claim 4, the said actuating means having portions independently movable for removal respectively of said plug and of effecting movement of the said closure member.

6. The subject matter of claim 4, there being a stuffing box around said stem at an upper limit of the said elongated chamber and bleeder means for relieving fluid pressure within said elongated chamber after closing the last mentioned valve means to shut off a portion of said latter chamber.

References Cited in the file of this patent
UNITED STATES PATENTS

| | | |
|---|---|---|
| 1,898,935 | Brandriff | Feb. 21, 1933 |
| 2,171,937 | Larry et al. | Sept. 5, 1939 |